April 26, 1960
G. RUESHOFF
2,933,919
ALUMINIZED BUILDING MATERIAL
Filed May 20, 1958
2 Sheets-Sheet 1
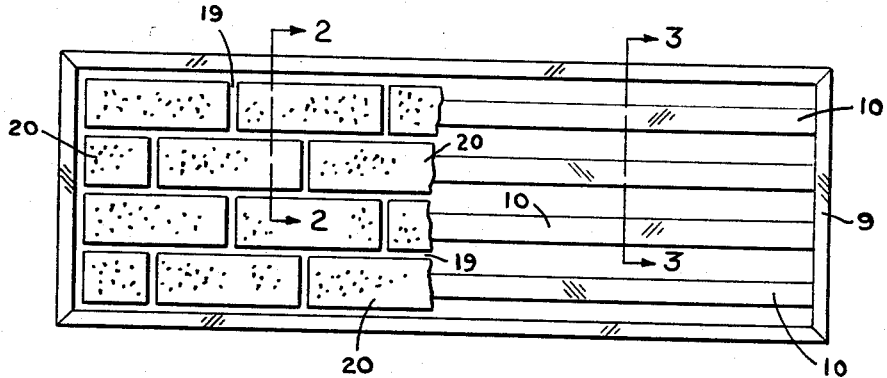
FIG. 1
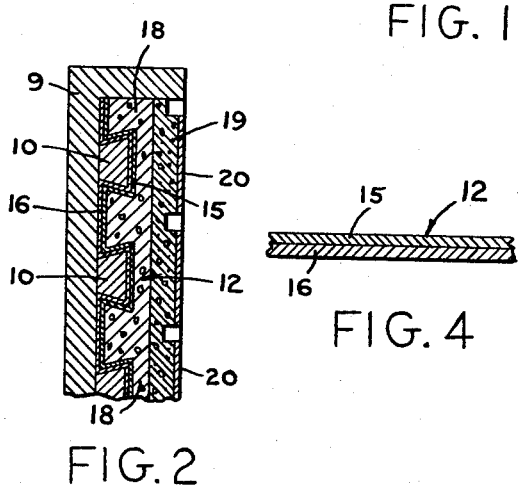
FIG. 2
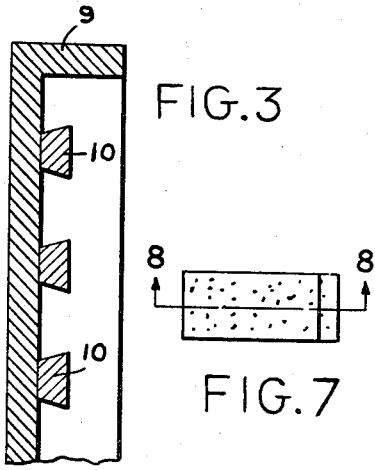
FIG. 3
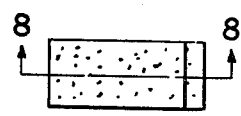
FIG. 4
FIG. 7
FIG. 5
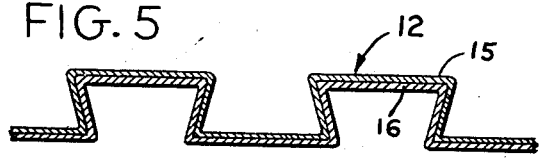
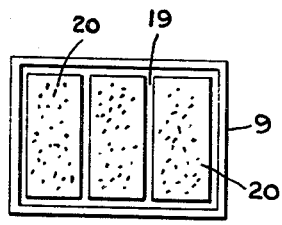
FIG. 6
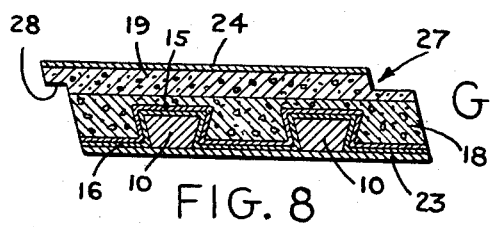
FIG. 8
GERHARD RUESHOFF
INVENTOR.
BY Roy Griffith Jones

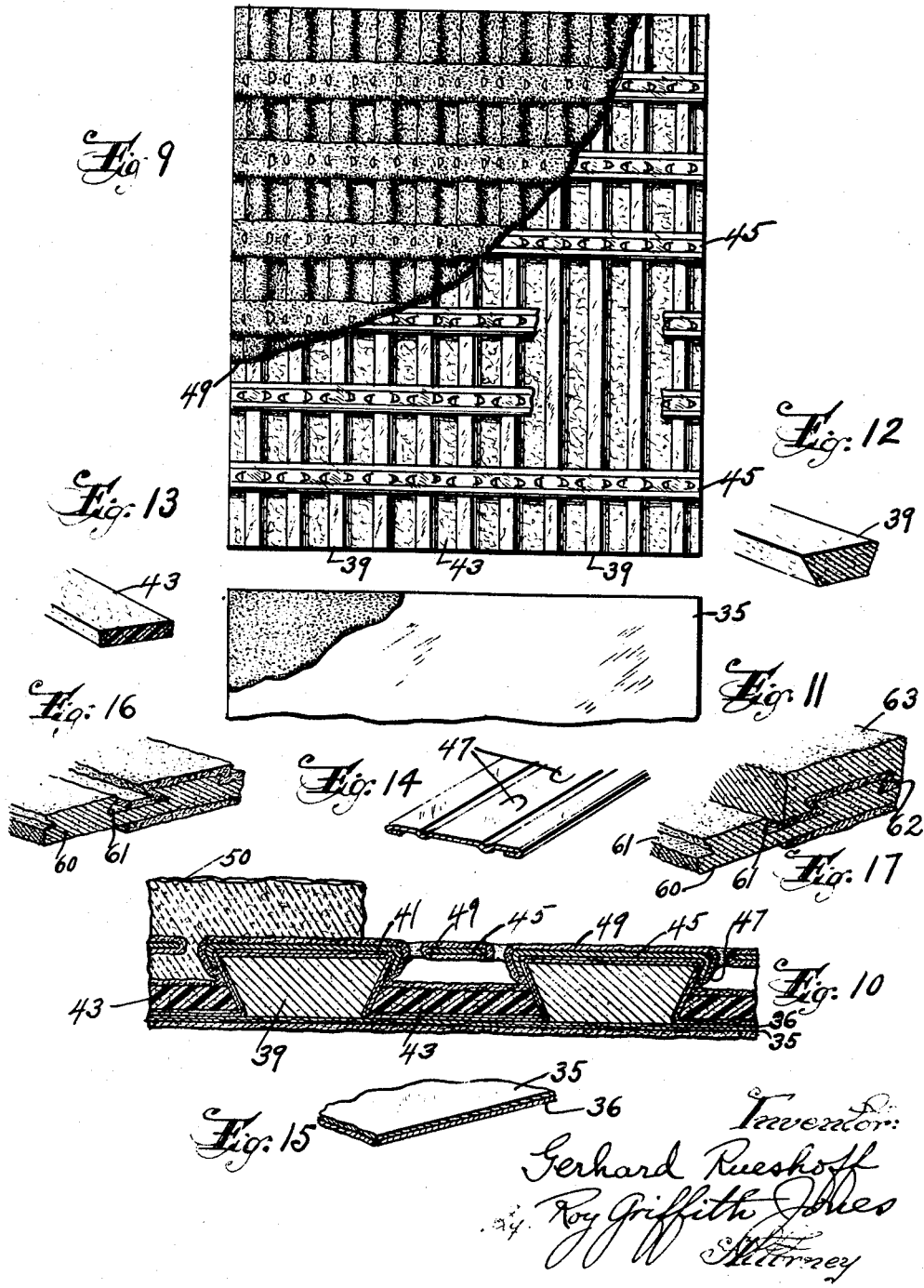

United States Patent Office

2,933,919
Patented Apr. 26, 1960

2,933,919

ALUMINIZED BUILDING MATERIAL

Gerhard Rueshoff, North Brunswick, N.J.

Application May 20, 1958, Serial No. 736,601

1 Claim. (Cl. 72—28)

This invention relates to composite or laminated aluminized building material and to a method of making the same.

One object of the invention is to provide means for holding, within the laminated sheet, a sheet of aluminum or aluminum foil, to concrete, without using fasteners.

Another object is to provide a prefabricated building material which is inexpensive, waterproof, and heat-insulating. The material is also of comparatively light weight, strong, non-cracking, and durable, and avoids the present, expensive and otherwise objectionable, method of surfacing a building by first nailing wire mesh all over it and then covering the mesh with cement.

The use of aluminum foil on a backing sheet is especially valuable, as it is inexpensive, and not only reflects heat rays to provide insulation, but also waterproofs the material, it being known that rains, especially driving rains, leak through mortar and a considerable thickness of concrete.

The material is formed in sheets of predetermined dimensions, and these may be made by laying down a series of spaced, parallel, mason or dovetail laths, or equivalent, so formed and positioned as to retain a layer of concrete. The laths may be of wood or of other preferred material, and are laid in a mould with wider face up. A thin sheet of aluminum foil, or thicker if desired, and preferably adhering to a supporting sheet, or backing as of paper or equivalent, is then laid on top of the laths and bent to conform to the sides thereof, and extending between adjacent laths of the series. Or the aluminum sheet may be preformed to fit over the laths. Concrete, preferably light-weight concrete, is then poured over the composite foil-paper sheet. When a decorative effect is desired, a layer of cement, which may be colored, is laid on the concrete, and finally, relatively thin, bricks are then embedded in the cement, the latter then apparently lying only between the thin red blocks, giving the appearance of conventional brickwork. The laminated sheet is then turned over and a layer of aluminum, or aluminum on paper, is affixed to the inner face of said composite sheet.

The drawings illustrate the invention, and in these:

Fig. 1 is a plan view, partly of the finished material and partly of the unfinished material;

Figs. 2 and 3 are sectional views taken respectively on lines 2—2 and 3—3 of Fig. 1;

Fig. 4 is an enlarged sectional view showing a composite sheet of aluminum foil and paper, used in making the building material;

Fig. 5 is a sectional view of the composite sheet of Fig. 4 after folding to fit over laths and shown in Figs. 1, 2, 3 and 8;

Fig. 6 is a plan view of a finished small sheet of the building material;

Fig. 7 is a plan view of a unit made in accordance with the invention; and

Fig. 8 is a sectional view, taken on line 8—8 of Fig. 7.

Referring to the drawings for a more detailed description thereof, the numeral 9 indicates a mould board with raised edges. Mason laths 10 are laid in spaced, parallel relation on said board. These laths are sometimes called dovetail laths, having tapering sides, and are laid on the mould board with the narrower surface on the board. The tops and sides of the laths, as well as the surface of the board between the laths, are then covered with a composite sheet 12, comprising aluminum foil adherent on a backing sheet, the latter being paper, for example, as shown in Fig. 4, the foil being numbered 15 and the backing sheet 16. When laid on the laths and board, as mentioned, the composite sheet assumes the shape shown in Fig. 5. It is also shown, as laid, in Figs. 2 and 8. A layer of concrete 18, preferably light weight concrete, is then poured into the mould board, covering the composite sheet and for a thickness thereabove. The dovetail form of the laths, positioned as stated, functions to hold the composite sheet to the concrete, as is readily seen, without using fasteners.

To form a decorative surface, such as a brick-simulating surface, for example, a layer 19 of cement is put on the concrete layer 18. This cement layer may be black, for example, to contrast with thin red blocks 20 of preformed cement which simulate conventional brick. The blocks 20 are spaced on layer 19, so that the black cement appears between them, to simulate the mortar of brickwork. The bottom or back of the building material is also preferably covered with the mentioned composite aluminum foil with backing sheet, for additional insulating and water proofing effect, as indicated at 23 of Fig. 8.

Fig. 8 shows a unit of the described building material, constituted as previously described, which may be either the size of an ordinary brick, in which case the thin top layer 24 simulates a single brick, or it may be a large sheet. In either case, it is recessed at the upper right corner as at 27, and the upper left corner has a tongue 28 to fit into recess 27 of an adjacent brick, the sides being oblique, to assist in forming a good joint.

In Figs. 9–15, I show another improved form of the invention. In this form, the bottom layer, or, as nailed up in a structure, the inside layer, is a composite sheet (Fig. 15) of aluminum foil 35 on paper 36, the foil being at the bottom or innermost layer (Fig. 10) as part of the building sheet. Spaced mason laths 39 are laid parallel on said composite sheet, and over the tops and sides of these, and between them, a composite sheet 41 of aluminum foil and paper is laid. Between the laths, strips of heat-insulating material 43 are laid (Fig. 10), which may be of a foam material, such as foam plastic. These strips, as shown, do not fill the spaces between the laths. Spaced cross strips 45, preferably of aluminum, are laid on the composite sheet 41, and are secured by punching tongues 47 adjacent the sides of the laths and bending them inwardly onto the inclined sides of the laths. Either of two different methods may then be followed to produce a salable product. One of such methods is to spray a thin layer of cement 49 (Fig. 10), over the structure thus far described; a relatively thick layer of cement is to be added after the board is nailed up. The second method is to apply a relatively thick layer of cement 50, as fragmentarily shown in Fig. 10, either over the thin layer 49 or when omitting the latter. Other metals and metal foils may be used instead of aluminum if desired.

A feature of this invention is that, with only the thin layer 49 of concrete applied as stated, and before the relatively thick layer is put on, the sheets are bendable to go around corners by cutting the metal cross strips 45 where the material is to bend.

In Figs. 16 and 17, I show a different construction, and in these the numeral 60 indicates a block of insulating material, such as foam plastic or compressed mineral wool, for example. Parallel dove-tail grooves 61 are cut into one face of said block. A thin layer 62 of cement is then sprayed onto the block, the grooves functioning to better hold the layer of cement. This product is salable, but after it has been nailed up, a thicker layer 63 of cement is put onto the thin layer by the builder, and it is for the secure holding of the thicker layer that the dove tail grooves are of importance.

What is claimed is:

A laminated sheet of building material consisting essentially of a series of spaced, parallel, mason or dove-tail laths having sides and faces, wider faces outermost, a composite sheet of aluminum foil and paper covering the outer faces and the sides of said laths and extending between adjacent laths, strips of insulating material filling only the lower part of the respective spaces between the laths, spaced metal strips over said laths crosswise and secured thereto, and a relatively thin layer of cement covering the tops of the laths and metal strips and the insulating material and the sides of the laths above the insulating material, leaving an air space between the upper parts of the laths, and a bottom or inner sheet forming the base of the building material, said metal strips comprising tongues clinched against the sides of the laths, the whole forming a flexible sheet which may be nailed in place and a relatively thick layer of cement applied to the thin cement layer.

References Cited in the file of this patent

UNITED STATES PATENTS

| | | |
|---|---|---|
| 1,188,536 | Ford | June 27, 1916 |
| 1,191,765 | Crumbaugh | July 18, 1916 |
| 1,333,628 | Munroe | Mar. 16, 1920 |
| 1,476,078 | Janpole | Dec. 4, 1923 |
| 1,677,073 | Cohen | July 10, 1928 |
| 1,824,210 | Jacobs | Sept. 22, 1931 |
| 1,930,024 | Varden | Oct. 10, 1933 |
| 2,085,635 | Coddington | June 29, 1937 |
| 2,176,327 | Buttress | Oct. 17, 1939 |
| 2,198,885 | Price | Apr. 30, 1940 |
| 2,356,309 | Garbe | Aug. 22, 1944 |
| 2,575,758 | Herd | Nov. 20, 1951 |